(12) United States Patent
Bittar

(10) Patent No.: US 6,359,438 B1
(45) Date of Patent: Mar. 19, 2002

(54) MULTI-DEPTH FOCUSED RESISTIVITY IMAGING TOOL FOR LOGGING WHILE DRILLING APPLICATIONS

(75) Inventor: Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/493,481

(22) Filed: Jan. 28, 2000

(51) Int. Cl.[7] .............................. G01V 3/18; G01V 3/20
(52) U.S. Cl. ........................................ 324/369; 324/339
(58) Field of Search ................................ 324/338, 339, 324/366, 369, 370, 371, 340, 341, 342, 343, 355, 356; 702/6, 7

(56) References Cited

U.S. PATENT DOCUMENTS

| | | | |
|---|---|---|---|
| 3,305,771 A | 2/1967 | Arps | 324/6 |
| 5,332,048 A | 7/1994 | Underwood et al. | 175/26 |
| 5,339,037 A | 8/1994 | Bonner et al. | 324/366 |
| 5,463,320 A | * 10/1995 | Bonner et al. | 324/366 |
| 5,899,958 A | 5/1999 | Dowell et al. | 702/6 |

OTHER PUBLICATIONS

Six Arm Dipmeter, Halliburton Logging Services (copyright 1989). Pub.

Darwin Ellis, *Well Logging for Earth Scientists*, pp. 84–91, Elsevier (1987).

S. Bonner, et al., *A New Generation of Electrode Resistivity Measurements for Formation Evaluation While Drilling*, SPWLA 35th Annual Logging Symposium, Jun. 19–22, 1994. pp. 1–18.

Bittar, M.S., Rodney, P.F., Mack, S.G., Bartel, R.P., *A True Multiple Depth of Investigation Electromagnetic Wave Resistivity Sensor: Theory, Experiment and Prototype Field Test Results*, Society of Petroleum Engineers (SPE) 22705 (1991).

(List continued on next page.)

*Primary Examiner*—Jay Patidar
(74) *Attorney, Agent, or Firm*—Conley, Rose & Tayon

(57) ABSTRACT

A resistivity tool for use in an LWD system includes a transmitter array with multiple transmitters positioned above a pair of receivers. The transmitters are selectively energized, causing current to be induced in the collar of the tool. The axial current in the tool collar is measured by the pair of receivers to determine the amount of current that flows into the formation between the receivers. From this, the formation resistivity can be measured for each transmitter to provide multiple depths of investigation. In addition, the lower receiver also can be used to selectively monitor the bit resistivity. A plurality of discrete electrodes are positioned between the two receivers to permit imaging of the borehole by obtaining azimuthally sensitive resistivity readings based upon the voltage level at each discrete electrode and the amount of current flowing into the formation. In one embodiment, the voltage level of each discrete electrode also is summed to provide a radial resistivity reading based on the summed voltage levels and the current flowing into the formation. In a second embodiment, a ring electrode also is provided from which a voltage level is obtained in the vicinity of the receiver array for use in computing the radial resistivity reading. According to another embodiment, the discrete electrodes are formed as lateral-logs with a conductive central disc surrounded by two concentric metal rings and a focusing metal ring. In this embodiment, the concentric rings are kept at the same voltage by changing the amount of current that is emitted from the focusing metal ring. By measuring the amount of current emitted, together with the voltage at one of the concentric rings, an azimuthally sensitive focused resistivity reading can be obtained.

21 Claims, 8 Drawing Sheets

OTHER PUBLICATIONS

Ball, S., and Hendricks, W.E., *Formation Evaluation Utilizing a New MWD Multiple Depth of Investigation Resistivity Sensor*, Fifteenth European Formation Evaluation Symposium (May 5–7, 1993). pp. 1–26.

*Open Hole Services*, Halliburton Logging Services, p. 28 (1992).

David P. Shattuck, Michael S. Bittar, Liang C. Shen, *Scale Modelling of the Laterolog Using Synthetic Focusing Method*, The Log Analysts, p. 357–369, Jul.–Aug. (1987).

* cited by examiner

MULTI-DEPTH FOCUSED RESISTIVITY IMAGING TOOL FOR LOGGING WHILE DRILLING APPLICATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a logging-while-drilling (LWD) tool that measures the resistivity of formations adjacent the wellbore. More particularly, the present invention relates to an LWD focused resistivity tool with multiple transmitters to provide multiple depths of investigation. Still more particularly, the present invention relates to a bottomhole drilling assembly that includes an LWD resistivity tool for determining characteristics of the borehole and formation during the drilling of a well, and correlating that information with depth to produce an image of some desired portion of the borehole.

2. Background of the Invention

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods. Logging has been known in the industry for many years as a technique for providing information regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed steel cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface, and control signals from the surface to the sonde. In accordance with conventional techniques, various parameters of the earth's formations are measured and correlated with the position of the sonde in the borehole, as the sonde is pulled uphole.

The sensors used in a wireline sonde may include a source device for transmitting energy into the formation, and one or more receivers for detecting the energy reflected from the formation. Various sensors have been used to determine particular characteristics of the formation, including resistivity sensors, nuclear sensors, and acoustic sensors. See generally J. Labo, *A Practical Introduction to Borehole Geophysics* (Society of Exploration Geophysicists 1986); "Six Arm Dipmeter," Halliburton Logging Services (copyright 1989).

While wireline logging is useful in assimilating information relating to formations downhole, it nonetheless has certain disadvantages. For example, before the wireline logging tool can be run in the wellbore, the drillstring and bottomhole assembly first must be removed or "tripped" from the borehole, resulting in considerable cost and loss of drilling time for the driller (who typically is paying daily fees for the rental of drilling equipment). In addition, because wireline tools are unable to collect data during the actual drilling operation, the drilling service company must at times make decisions (such as the direction to drill) possibly without sufficient information, or else incur the cost of tripping the drillstring to run a logging tool to gather more information relating to conditions downhole. In addition, because wireline logging occurs a relatively long period after the wellbore is drilled, the accuracy of the wireline measurement can be compromised. As one skilled in the art will understand, the wellbore conditions tend to degrade as drilling fluids invade the formation in the vicinity of the wellbore. Consequently, a resistivity tool run one or more days after a borehole section has been drilled may produce measurements that are influenced by the resistivity of the mud that has invaded the formation. In addition, the shape of the borehole may begin to degrade, reducing the accuracy of the measurements. Thus, generally, the sooner the formation conditions can be measured, the more accurate the reading is likely to be. Moreover, in certain wells, such as horizontal wells, wireline tools cannot be run.

Because of these limitations associated with wireline logging, there is an increasing emphasis on developing tools that can collect data during the drilling process itself. By collecting and processing data and transmitting it to the surface real-time (or near real-time) while drilling the well, the driller can more accurately analyze the surrounding formation, and also can make modifications or corrections, as necessary, to optimize drilling performance. With a steerable system the driller may change the direction in which the drill bit is headed. By detecting the adjacent bed boundaries, adjustments can be made to keep the drill bit in an oil bearing layer or region. Moreover, the measurement of formation parameters during drilling, and hopefully before invasion of the formation, increases the usefulness of the measured data. Further, making formation and borehole measurements during drilling can save the additional rig time which otherwise would be required to run a wireline logging tool.

Designs for measuring conditions downhole and the movement and the location of the drilling assembly, contemporaneously with the drilling of the well, have come to be known as "measurement-while-drilling" techniques, or "MWD." Similar techniques, concentrating more on the measurement of formation parameters of the type associated with wireline tools, commonly have been referred to as "logging while drilling" techniques, or "LWD." While distinctions between MWD and LWD may exist, the terms MWD and LWD often are used interchangeably. For the purposes of this disclosure, the term LWD will be used generically with the understanding that the term encompasses systems that collect formation parameter information either alone or in combination with the collection of information relating to the position of the drilling assembly.

Ordinarily, a well is drilled vertically for at least a portion of its final depth. The layers or strata that make up the earth's crust are generally substantially horizontal. Therefore, during vertical drilling, the well is substantially perpendicular to the geological formations through which it passes. In certain applications, however, such as when drilling from an off-shore platform, or when drilling through formations in which the reservoir boundaries extend horizontally, it is desirable to drill wells that are oriented more horizontally. When drilling horizontally, it is desirable to maintain the well bore in the pay zone (the formation which contains hydrocarbons) as much as possible so as to maximize the recovery. This can be difficult since formations may dip or diverge. Thus, while attempting to drill and maintain the well bore within a particular formation, the drill bit may approach a bed boundary. Many in the industry have noted the desirability of an LWD system that could be especially used to detect bed boundaries and to provide real-time data to the driller to enable the driller to make directional corrections to stay in the pay zone. Alternatively, the LWD system could be used as part of a "smart" system to automatically maintain the drill bit in the pay zone. See, e.g. commonly assigned U.S. Pat. No. 5,332,048, the teachings of which are incorporated by reference herein. The use of an LWD system with these other systems makes it possible to conduct at least certain portions of drilling automatically.

The measurement of formation properties during drilling of the well by LWD systems thus improves the timeliness of measurement data and, consequently, increases the efficiency of drilling operations. Typically, LWD measurements are used to provide information regarding the particular formation through which the borehole crosses. Currently, logging sensors or tools that commonly are used as part of either a wireline or an LWD system include resistivity tools. For a formation to contain hydrocarbons and permit the hydrocarbons to flow through it, the rock comprising the formation must have certain well known physical characteristics. One characteristic is that the formation has a certain measurable resistivity (the inverse of conductivity), which can be determined by appropriate transducers in the drill string. Analysis of the data from these transducers provide information regarding the resistivity of the formation surrounding the resistivity tool, which then can be used in combination with other measurements to predict whether the formation will produce hydrocarbons. In addition, a sudden measured change in resistivity at the boundary between beds of shale and sandstone can be used to locate these boundaries. In horizontal drilling, the drill bit preferably can then be steered to avoid this boundary and keep the wellbore inside the oil-producing bed. However, to accomplish this detection reliably, a great deal of data is required from the resistivity tool.

To prevent blowouts, wells typically are drilled with a positive hydrostatic pressure so that the pressure in the borehole is greater than the pressure in the formation. The positive hydrostatic pressure in the borehole results from pumping specially formulated drilling mud into the wellbore during the drilling process. Because the drilling mud is maintained at a higher pressure than the formation, the mud tends to invade the permeable formation surrounding the borehole, forcing the original connate water to be driven away from the borehole. This flushing of drilling mud filtrate into the formation creates an invaded or flushed zone around the borehole, with a transition zone between the flushed and undisturbed zones. The depth of invasion of the drilling mud is a factor of the formation porosity, the differential drilling pressure, permeability of the formation, water loss of the drilling fluid, and time.

Because of this invasion of the formation by the drilling fluid, it is generally desirable for the resistivity tool to measure at multiple depths into the formation around the borehole between the transmitter and receiver. By using several resistivity sensors, with each responding predominately to a different depth of investigation (such as deep, medium and shallow), the deeper reading sensors can be corrected based upon the measurements obtained from the shallower reading sensors.

Thus, referring to FIG. 1, the first and closest diameter of investigation relative to the resistivity tool is the area within the wellbore through which drilling mud flows back to the surface. If the resistivity of this area is measured inside the wellbore (around the tool itself), a resistivity value will be obtained that generally approximates the resistivity of the drilling mud, $R_m$. This diameter of investigation can be referred to as $D_m$, to denote that this is the depth of investigation that will produce a resistivity reading of the drilling mud. The next general area of investigation is the region within the surrounding formation that has been invaded by the drilling mud. This diameter of investigation can be referred to as $D_i$, because a resistivity measurement in this region will yield the resistivity of the invaded zone, which may be denoted as $R_{xo}$. The third region of investigation for a resistivity tool is the formation which has not been invaded by drilling mud. A resistivity measurement of this region will yield the true resistivity value of the formation, $R_t$. While information regarding $R_m$ and $R_{xo}$ are useful for purposes of evaluation, one of the goals of the resistivity tool is to measure the true formation resistivity, $R_t$. Thus, it is important to design the resistivity tool to have sufficient depths of investigation to measure this resistivity.

As one skilled in the art will understand, there are various types of resistivity measuring tools used to log wellbores. As described generally in Darwin Ellis, *Well Logging for Earth Scientists*, pp. 84–91 (Elsevier 1987), focused resistivity or laterologs are electrode devices that force a measuring current into the formation. The concept of focusing is illustrated in FIG. 2, where three current emitting electrodes $A_0$, $A_1$, and $A_{1'}$ are shown in a Laterolog-3 configuration. The potential of electrodes $A_1$ and $A_{1'}$ is held constant and at the same potential as the central electrode $A_0$. Because current only flows if a potential difference exists between the electrodes, theoretically no current flows vertically between the electrodes. Thus, as shown in FIG. 2, a sheath of current emanates horizontally from the central electrode $A_0$. The amount of current emanating from electrode $A_0$ can be used to determine the resistivity of the formation using Ohm's Law.

An implementation of a focused resistivity device is disclosed in U.S. Pat. No. 3,305,771, issued to Arps. As described in that patent, a pair of toroidal transmitters are mounted in a logging sonde, positioned above and below a pair of toroidal receivers. An alternating current generator excites the toroidal transmitters, which induces current into the formation. The receivers are symmetrically located with respect to the transmitters, and detect the current that passes out of the collar into the formation between the two receivers. Because the source voltage is known, resistivity of the formation in the vicinity of the receivers can be determined as:

$$R=k(V/I),$$

where R is the formation resistivity, V is the source voltage, I is the measured current flowing out into the formation between the toroidal receivers (i.e. the difference in current measured at each receiver), and k is a tool constant dependent on the spacing of the toroids.

Resistivity tools based generally upon the system disclosed in Aarps have been used for many years. One example of such a tool is found in S. Bonner, et al., "A New Generation of Electrode Resistivity Measurements For Formation Evaluation While Drilling," SPWLA 35th Annual Logging Symposium, Jun. 19–22, 1994. See also U.S. Pat. No. 5,339,037. A simple illustration of the LWD tool described in the Bonner et al. article is depicted in FIG. 3. The LWD tool disclosed in this article makes five formation resistivity measurements using two toroidal transmitters. One resistivity measurement uses the drill bit as part of the measuring electrode. The other four resistivity measurements are characterized as high vertical resolution electrode resistivities that are focused. One of the high vertical resolution measurements uses a ring electrode to make an azimuthally averaged resistivity. The other three high vertical resolution electrodes use button electrodes that are vertically aligned to make azimuthally sensitive resistivity measurements. Together the ring and buttons give a total of four depths of investigation.

While the LWD tool disclosed in the Bonner et al. article provides multiple depths of investigation it has some serious drawbacks. One of those is that three of the four high vertical resolution resistivity measurements are azimuthally sensitive. Thus, three of the four high resolution measurements are sensitive to the orientation of the tool in the borehole. This can be problematic if the bottomhole assembly is not rotating. Thus, if the bottomhole assembly is being steered (or is "sliding"), the LWD tool in Bonner et al will have only one sensor that obtains high resolution resistivity measurements around the borehole. The other three sensors will point in the same direction, and thus will not be able to capture resistivity measurements around the entire circumference of the borehole. Similarly, if a drill string is used that is not rotated during normal drilling operations, the Bonner et al. system will have limited application. Thus, in applications where the drill string is not rotated, the Bonner et al. tool will not obtain an image of the borehole from the button electrodes.

Although the Bonner et al. design incorporates a two transmitter configuration, it is known to use additional transmitters to obtain more depths of investigation in resistivity measurements. For example, it has been suggested that four transmitters be used with a pair of receivers in a standard resistivity tool. See M.S. Bittar, et al., "A True Multiple Depth of Investigation Electromagnetic Wave Resistivity Sensor: Theory, Experiment and Prototype Field Test Results," presented at the 66th Annual Technical Conference and Exhibition of the Society of Petroleum Engineers on Oct. 6–9, 1991; S. Ball, et al., "Formation Evaluation Utilizing a New MWD Multiple Depth of Investigation Resistivity Sensor," presented at the Fifteenth European Formation Evaluation Symposium on May 5–7, 1993. Each transmitter fires sequentially, with attenuation and phase shift measurements being made based on the amplitude and time of the signals received by the receiver pair.

Attempts have been made to develop LWD tools that may be used to provide an image of the borehole. Imaging tools have been used in wireline tools for a number of years to obtain snapshot images of the borehole at particular depths. Thus, for example, the assignee of the present invention has used an acoustic logging tool as a wireline imaging device. See *Open Hole Services*, (Halliburton Logging Services 1992), p. 28. This device is commonly referred to as the Circumferential Acoustic Scanning Tool (or CAST). An example of an LWD imaging tool is shown in commonly assigned U.S. Pat. No. 5,899,958.

While the above tools and systems work well in their intended applications, it would be desirable to develop an LWD resistivity tool that can obtain focused resistivity measurements at multiple depths, while also providing an image of the borehole regardless of whether the tool is rotating. While the advantages of such a tool are immediately apparent to one skilled in the art, to date no one has successfully implemented such a system which overcomes the limitations listed above.

BRIEF SUMMARY OF THE INVENTION

The problems noted above are solved in large part by a focused resistivity logging tool that includes multiple toroidal transmitters positioned symmetrically or asymmetrically with respect to a toroidal receiver pair to obtain three different depths of investigation. In addition, a plurality of button or rectangular electrodes are positioned around the circumference of the logging tool to provide borehole imaging using the same transmitter and receiver array. The use of multiple button electrodes around the circumference of the tool enables imaging of the borehole, even if the drillstring is not rotating, as may occur when the bottomhole assembly is being steered, or when special drill string materials are used. In the preferred embodiment, the drill bit also is used to obtain a resistivity at the bit that can be used for early detection of bed boundaries.

In the preferred embodiment, each of the transmitters are alternatively energized to induce an axial current in the tool. The current flowing into the formation between the receiver coils is determined by measuring the axial current at each of the toroidal receivers. The difference in axial current measured by the receivers indicates the current flowing into the formation. This current measurement can then be used to determine the resistivity of the formation using Ohm's Law. The multiple transmitters enable current measurements from differently spaced transmitters, thus providing multiple depths of investigation.

In one embodiment of the invention, one or more ring electrodes are provided in the vicinity of the toroidal receivers and are used to measure formation resistivity. In addition to the measurement of axial current at the toroidal receivers, which determine the radial current $I_s$, the voltage ($V_{ring}$) at the ring electrode is measured and used to determine the resistivity of the formation. The resistivity of the formation R at each depth of investigation j is given by:

$$R_j = K_j \frac{V_{ringj}}{I_{sj}}$$

K represents a constant value that is determined by the spacing of the transmitters and receivers.

In addition to using the ring electrodes to determine the resistivity of the formation, a plurality of discrete electrodes also preferably are included to provide images of the borehole. The electrodes may take any of a variety of shapes, including a rectangular or circular shape. The electrodes may mount to the drill string between the toroidal receivers, and preferably are spaced around the circumference of the drilling tool. The voltage of each of the electrodes ($V_e$) is measured, and used to determine an azimuthally sensitive measure of formation resistivity ($R_e$) for each depth of investigation j.

$$R_{ej} = K_j \frac{V_{ej}}{I_{sj}}$$

According to the preferred embodiment of the present invention, at least three discrete electrodes are spaced circumferentially around the drill string to provide images of the resistivity at three different orientations. These images may be coordinated with depth and azimuthal orientation to provide a resistivity image of the borehole at certain defined intervals.

In an alternative embodiment, the ring electrodes may be eliminated if a sufficient number of discrete electrodes are provided. In this embodiment, the discrete electrodes are provided around the circumference of the drilling tool, the resistivity values for each of the discrete electrodes may be obtained to determine the azimuthally sensitive formation resistivity as:

$$R_{ej} = K_j \frac{V_{ej}}{I_{sj}}$$

where $V_{ej}$ is the voltage at each electrode. If the number of button electrodes is sufficient (for example, eight or more discrete electrodes are provided, spaced 45 degrees apart) the ring electrode can be eliminated by summing the voltages of all button electrode to get an apparent ring voltage ($V_{ring}$):

$$V_{ring} \cong \sum_{i=1}^{N} V_{ei}$$

where N represents the number of discrete electrodes and $V_{ei}$ is the voltage at each electrode.

The discrete electrodes comprise a metal structure mounted on the collar. The electrodes are electrically insulated from the collar. In yet another embodiment of the present invention, the electrodes are configured as circular lateral-log arrays, with an inner metal disc surrounded by three outer metal rings. The inner disc and outer rings are all separated by insulating material. These electrodes are operated to force current out of the inner disc by controlling the voltage of the outer rings.

These and other advantages of the present invention will become apparent on reading the detailed description of the invention in conjunction with the drawings.

BRIEF DESCRIPTION OF THE DRAWINGS

For a detailed description of the preferred embodiments of the invention, reference will now be made to the accompanying drawings in which.

NOTATION AND NOMENCLATURE

During the course of the foregoing and following description, the terms "above" and "below" are used to denote the relative position of certain components with respect to the direction of flow of the incoming drilling mud. Thus, where a term is described as above another, it is intended to mean that drilling mud flows first through the first component before flowing through the second component. As will be apparent to one skilled in the art, these and other terms are used to identify the relative position of components in the bottomhole assembly (or BHA), with respect to the distance to the surface of the well, measured along the wellbore path.

Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

Figure 7:
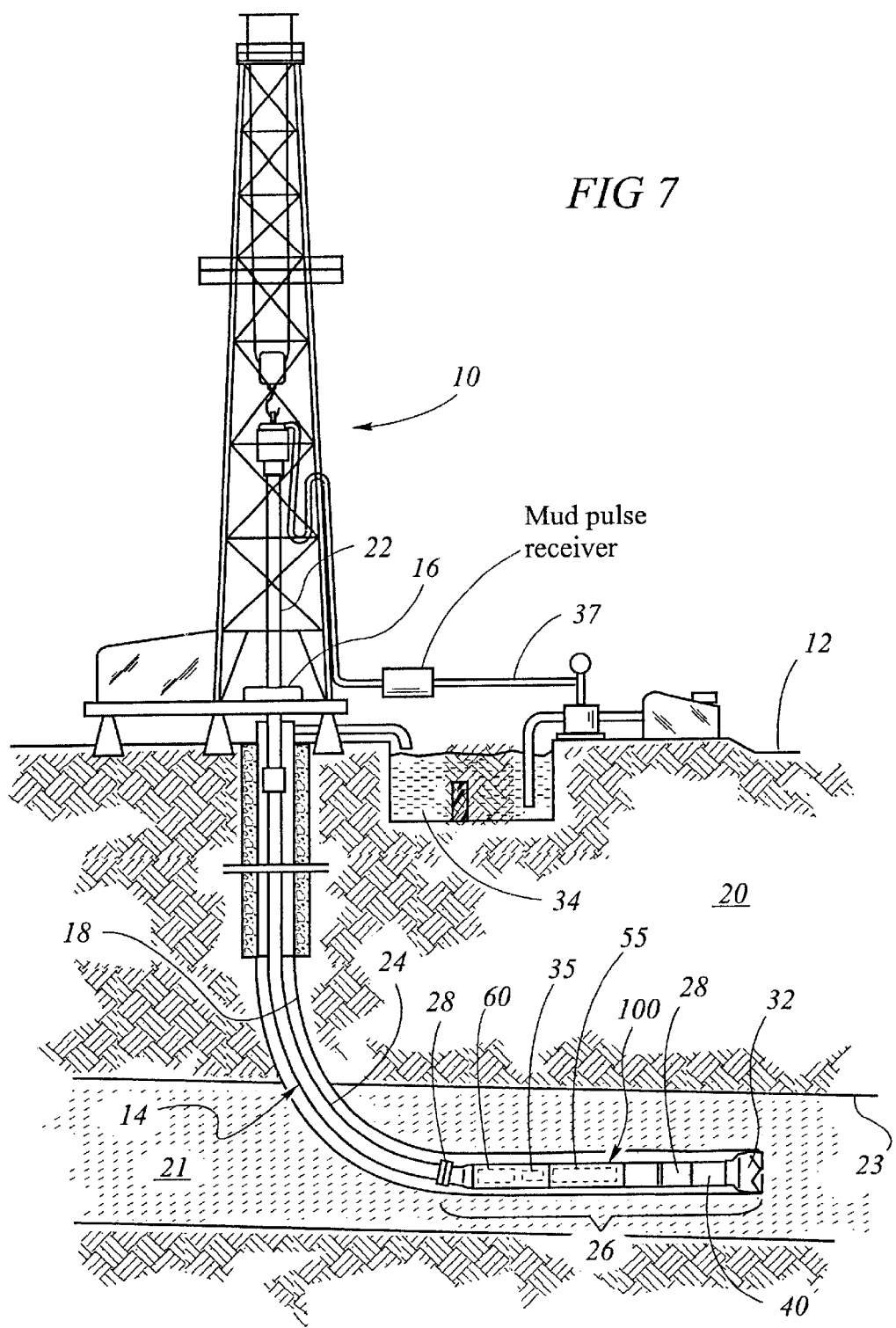
FIG. 7 is an illustration of a wellbore being drilled through subterranean formations in accordance with typical drilling practices.

Referring initially to FIG. 7, a drilling installation includes a drilling rig 10 at the surface 12 of a well, supporting a drill string 14. The drill string 14 extends through a rotary table 16 and into a borehole 18 that is drilled through earth formations 20 and 21. The drill string 14 includes a kelly 22 at its upper end, drill pipe 24 coupled to the kelly 22, and a buttom hole assembly 26 (commonly referred to as a "BHA") coupled to the lower end of the drill pipe 24. Alternatively, the drill string may comprise a section of coiled tubing instead of, or in addition to, the drill pipe. The BHA 26 may include a drill bit 32, a downhole motor 40, one or more drill collars 28, a resistivity tool 100 mounted in collar section 55, directional sensors located in a non-magnetic section 60, and one or more stabilizer(s) (not shown) for drilling through earth formations to create the borehole 18. In operation, the kelly 22, the drill pipe (or coiled tubing) 24 and the BHA 26 are selectively rotated by the rotary table 16. The drill collars 28, which also may be non-magnetic so as not to interfere with the LWD measurements, are used in accordance with conventional techniques to add weight to the drill bit 32 and to stiffen the BHA 26, thereby enabling the BHA 26 to transmit weight to the drill bit 32 without buckling. The weight applied through the drill collars 28 to the bit 32 permits the drill bit to penetrate underground formations.

As the drill bit 32 operates, drilling fluid or mud is pumped from a mud pit 34 at the surface through the kelly hose 37, into the drill pipe (or coiled tubing) 24, to the drill bit 32. After flowing through the drill bit 32, the drilling mud rises back to the surface through the annular area between the drill pipe 24 and the borehole 18, where it is collected and returned to the mud pit 34 for filtering. The drilling mud is used to lubricate the drill bit 32 and to remove cuttings from the borehole 18. The drilling mud may also perform a number of other functions, which could include providing operating power to the downhole motor or other components downhole. As one skilled in the art will realize, the downhole motor or turbine 40 may be used downhole to rotate the drill bit 32 as an alternative, or in addition to, rotating the drill string from the surface. As shown in FIG. 7, BHA 26 typically is defined as all of the downhole components from the top of the drill collars 28, down to the drill bit 32, including downhole motor 40.

As is known in the art, the non-magnetic section 60 typically includes directional sensors and drilling parameter sensors such as weight-on-bit (WOB), torque-on-bit (TOB), shock, vibration, etc. In one embodiment, directional sensors are provided in the BHA 26 to provide an indication of inclination angle, the horizontal angle, and the rotational angle (a.k.a. "tool face angle") of the BHA 26. In accordance with known techniques, wellbore directional measurements can be made.

The LWD tool 55 preferably is located close to the drill bit 32 to facilitate the ability to examine the formation as close to the bit as possible. As one skilled in the art will understand, the LWD tool 55 could also be located further up the BHA 26 from the drill bit 32 without departing from the principles of the present invention. Moreover, the LWD tool 55 may in actuality comprise multiple collar sections if necessary to house other LWD sensors. The LWD formation sensors preferably include the resistivity tool 100, which is described in more detail in association with FIG. 4. Other LWD formation sensors also may be provided if desired, including for example gamma, sonic, density and neutron sensors. A battery pack, communication sub, or other power source may be included in the LWD tool 55, or alternatively may be positioned in any convenient location to provide power to the various electrical assemblies in the BHA.

Still referring to FIG. 7, a downhole data signaling unit 35 can also be provided as part of BHA 26 and may be used to transmit sensed or processed data to a surface receiver via a mud pulse signal. The drilling mud can serve as a communication medium between the controller and components at the surface of the well. By altering the flow of the drilling mud through the interior of the drill string (or coiled tubing), pressure pulses may be generated in the column of drilling mud. By selectively varying the pressure pulses through the use of a mud pulser in the mud signaling unit 35, encoded pressure pulse signals can be generated to carry information indicative of downhole parameters to the surface for immediate analysis. In addition, the downhole system may also include the capability of receiving mud pulse signals from the surface to control the operation or activation of certain LWD sensors or other downhole components. Alternately, a composite drill string having embedded wires could be used to transmit data to the surface, or data could be saved downhole for retrieval when the BHA is tripped. In accordance with the preferred embodiment, the drilling fluid is conductive mud to facilitate the flow of the focused current into the formation.

A downhole controller or communication interface (not shown in FIG. 7) may control the operation of signaling unit 35 and orchestrate the operation of the LWD sensors and other BHA components. The controller may be located in sub 60 or elsewhere in the BHA 26. The controller also may make decisions based upon the processed data.

One or more stabilizers may be provided as part of the bottom-hole assembly. The stabilizer(s) could include adjustable blades in accordance with the disclosure in commonly assigned U.S. Pat. Nos. 5,318,137 and 5,318,138, the teachings of which are incorporated by reference as if fully set forth herein. As disclosed in these inventions, the inclination of the bottomhole assembly can be changed by selectively varying the extension of the stabilizer blades. As one skilled in the art will immediately recognize, the course of the BHA 26 also can be changed in accordance with other techniques, such as by selectively turning on or off a downhole motor, adjusting the angle of bend in a bent motor housing, or changing the weight on bit of the system. Use of adjustable components or drilling parameters in conjunction with an LWD system as disclosed herein makes it possible to design a "Smart System" for drilling certain portions of the wellbore automatically. Alternately, any other suitable system or assembly may be used for directional drilling without departing from the scope of the teachings herein. For example and as mentioned above, coiled tubing may be used in the drilling system, together with a motor or crawler device. One skilled in the art will understand, therefore, that the LWD system disclosed herein may be used in any drilling system or drilling operation in which it is desirable to detect and locate formations and bed boundaries, regardless of the bottomhole assembly and drill string components that are used.

Figure 1:
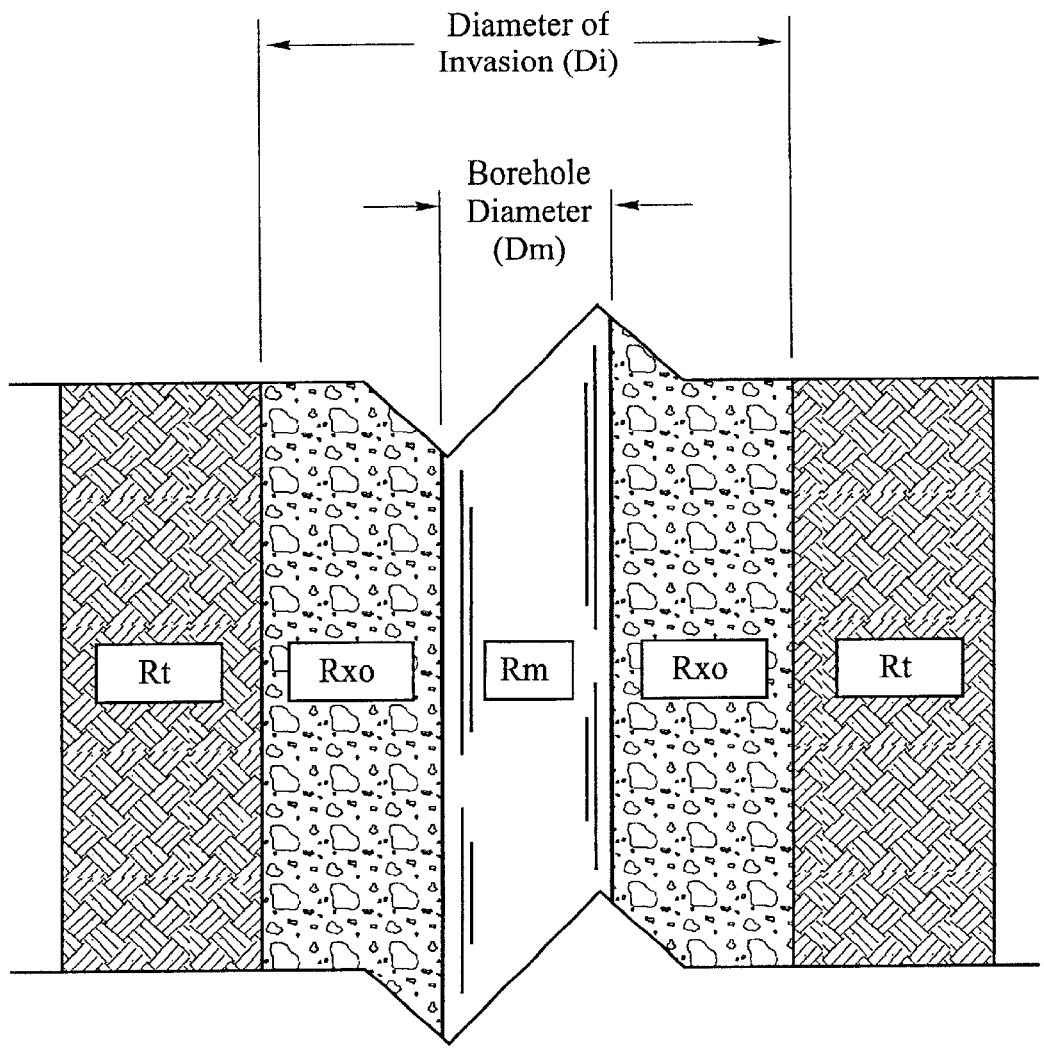
FIG. 1 illustrates the resistivity measurements obtained at different depths of investigation.
Figure 2:
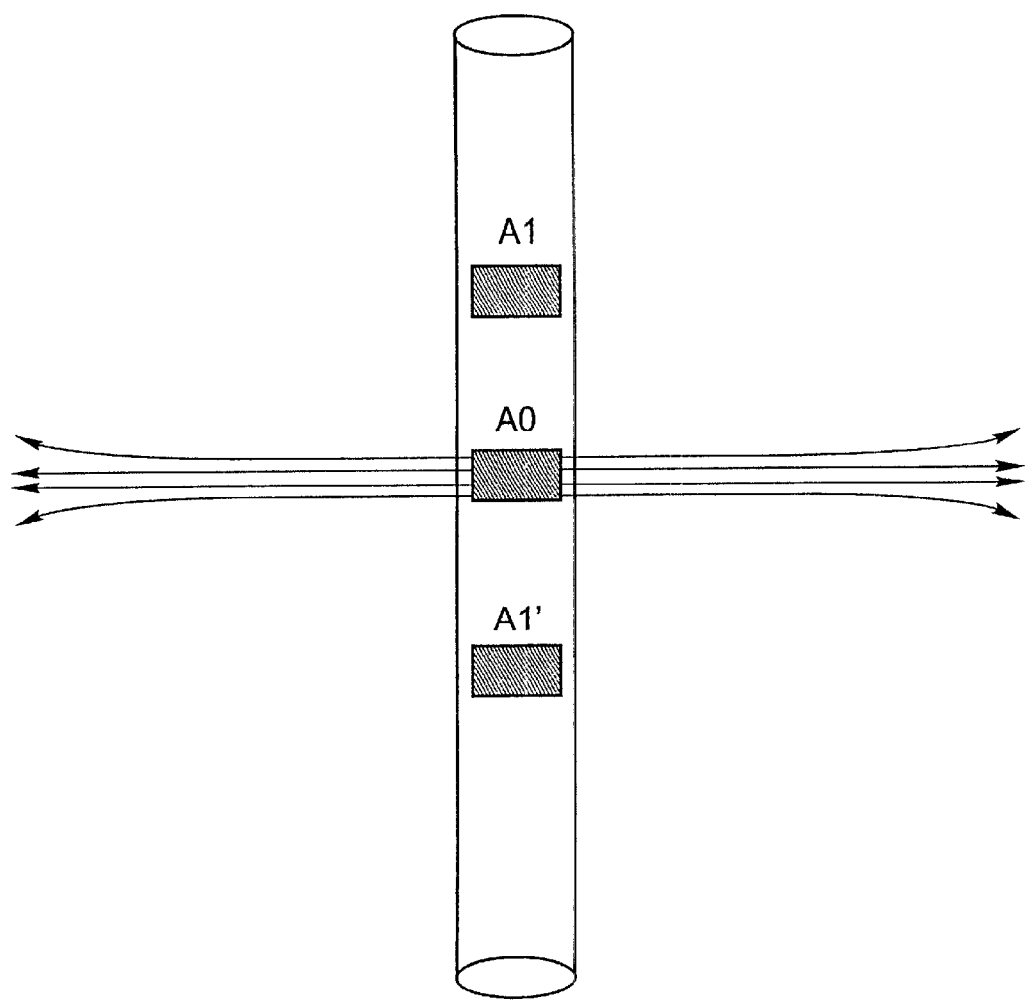
FIG. 2 shows a prior art resistivity tool that operates as a laterolog by focusing current into the formation surrounding a resistivity tool.
Figure 3:
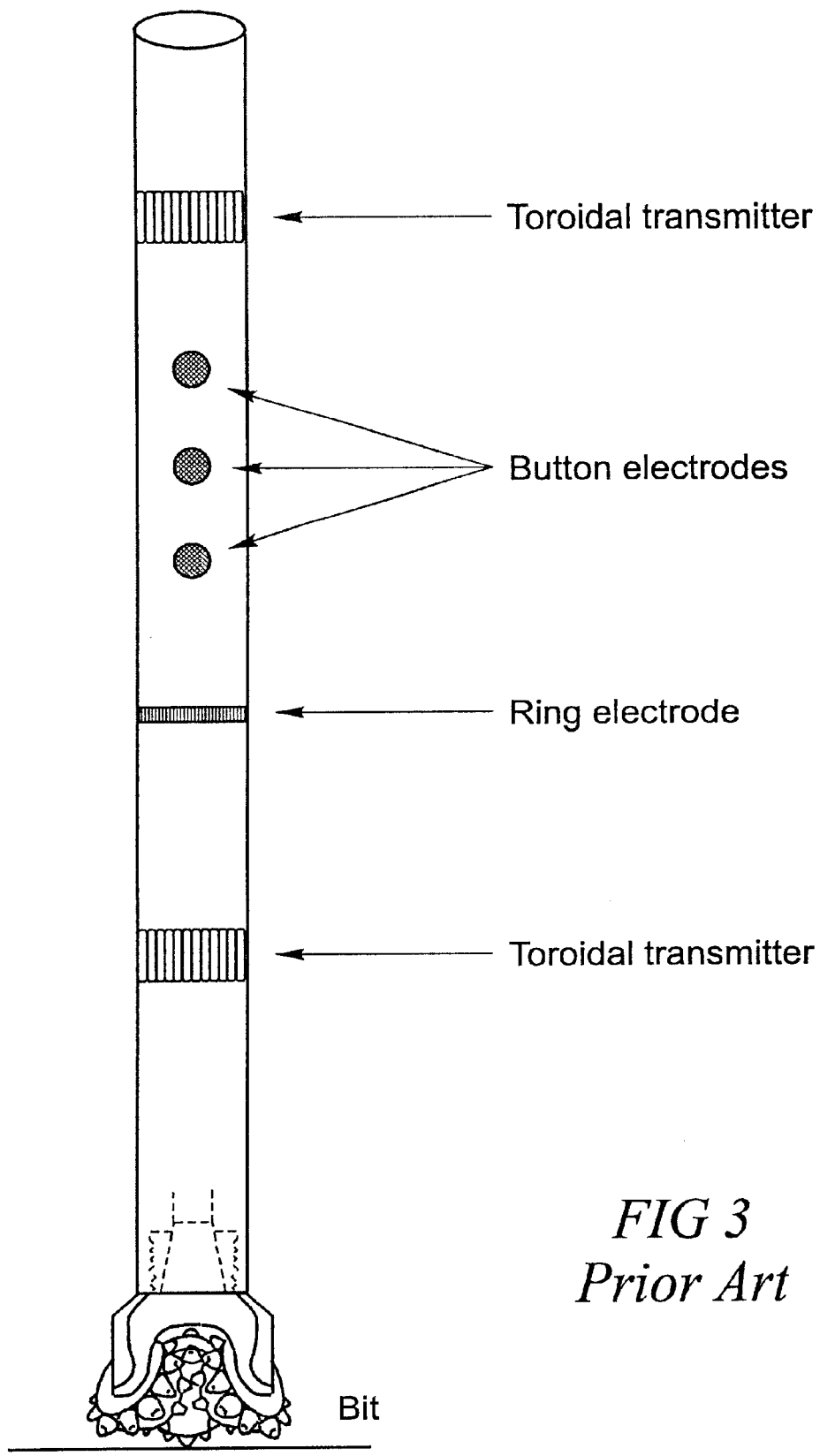
FIG. 3 shows a prior art resistivity tool that focuses current into the formation using a ring electrode and three button electrodes, in conjunction with a pair of toroidal transmitters.
Figure 4:
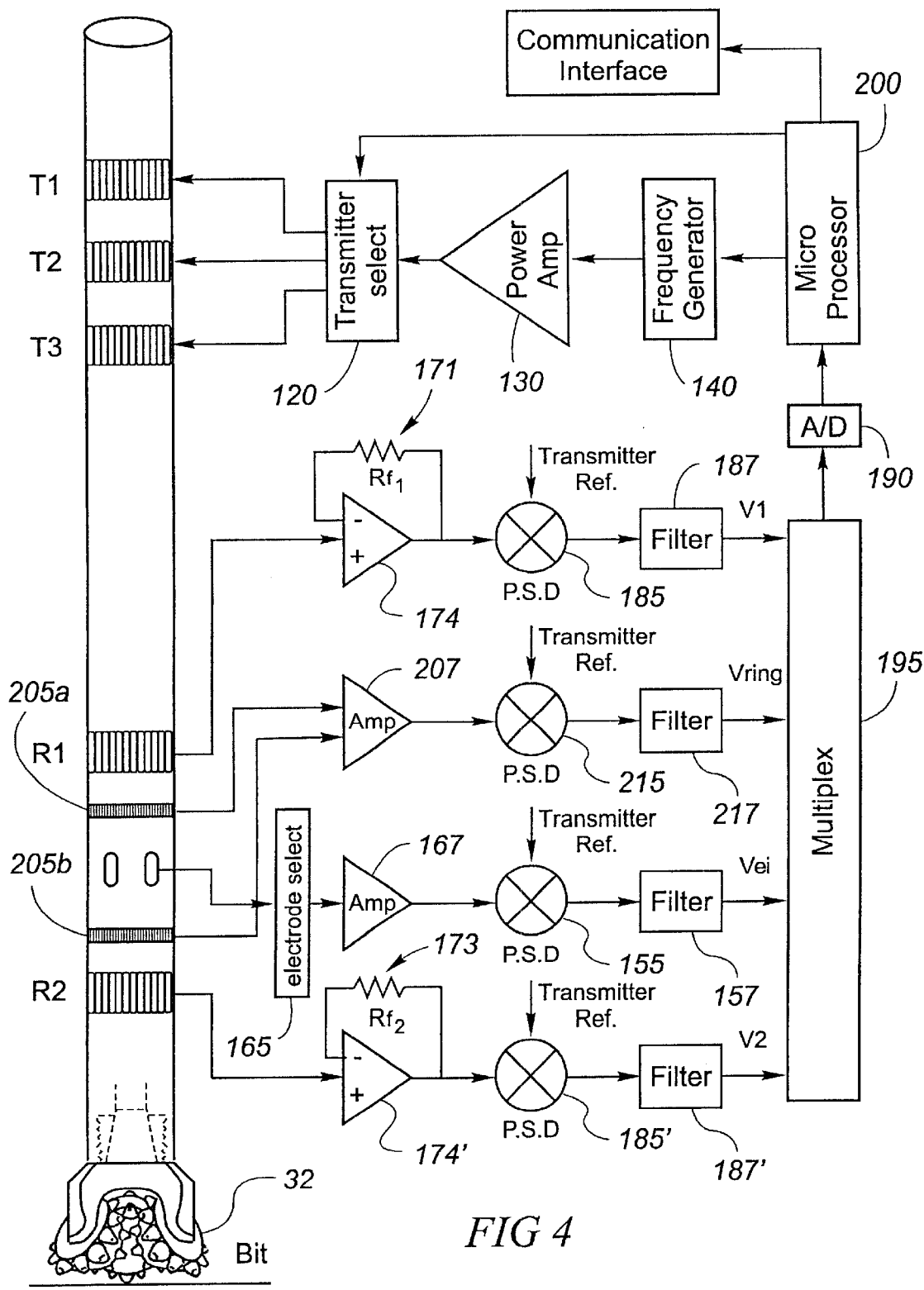
FIG. 4 shows a resistivity tool constructed in accordance with one embodiment of the present invention that includes three toroidal transmitters, a pair of toroidal receivers, two ring electrode and an array of discrete electrodes placed around the circumference of the tool.

Referring now to FIG. 4, the resistivity tool 100 constructed in accordance with the preferred embodiment generally comprises a first, second and third transmitter (identified as $T_1$, $T_2$, and $T_3$, respectively), a first and second receiver (identified as $R_1$ and $R_2$, respectively), a ring electrode 205, and an array of discrete electrodes 125. Although three transmitters are provided in the preferred embodiment, a different number of transmitters may be used if so desired. In addition, the resistivity tool works in conjunction with the resistivity measured at the drill bit 32, and thus bit 32 is depicted in FIG. 4 for purposes of illustration. Other downhole components have been omitted from FIG. 4 for the sake of clarity, and thus one skilled in the art will understand that other components may be included in the bottomhole assembly in accordance with normal industry practice.

In accordance with the preferred embodiment of FIG. 4, each of the transmitters $T_1$, $T_2$, and $T_3$ comprise toroids that are mounted on the resistivity tool 100 and equidistantly spaced along the collar 150 of resistivity tool 100. The toroids preferably comprise a conductive wire 105 wound about a magnetic core 110. As will be apparent to one skilled in the art, the conductive wire 105 couples to a alternating current generator 140 that causes current to flow through the winding. This flow of current through the winding forms the primary of a transformer, which induces a current in the resistivity tool collar. The return path of the induced current occurs through the formation.

The toroidal coils of the transmitters $T_1$, $T_2$, and $T_3$ are selectively energized by conventional circuitry, including a microprocessor 200, an alternating current generator 140, a power amplifier 130 and transmitter select logic 120. As shown in FIG. 4, the generator 140 connects electrically to the microprocessor 140 to receive one or more control signals from the microprocessor 200. The generator 140 connects electrically to the power amplifier 130, which receives and amplifies the output signal from the generator 140. The generator 140 preferably generates a relatively low frequency signal in the range of 1000–2000 Hz that is amplified by the power amplifier 130. In the preferred embodiment a single generator 140 selectively couples to each of the transmitters $T_1$, $T_2$, and $T_3$ by a transmitter select logic 120, which receives the amplified signal from the power amplifier. The transmitter select logic 120, which may for example comprise a multiplexor circuit, preferably couples to microprocessor 200. As will be understood by one skilled in the art, the transmitter select logic 120 receives signals from microprocessor 200 that determine which transmitter toroid will receive the amplified signal. Thus, according to one implementation, the microprocessor provides a two bit signal, either serially or in parallel, that couples to one or two select input terminals on the transmitter select logic 120. Thus, for example, if the microprocessor 200 determines that the amplified signal should be applied to transmitter $T_1$, the microprocessor may transmit a 01 signal (indicating a digital low voltage and a digital high voltage) to the transmitter select logic 120. In response, the transmitter select logic 120 passes the amplified signal from the generator 140 to transmitter toroid $T_1$. Conversely, if the microprocessor 200 determines that transmitter $T_2$ should be fired, the microprocessor may send a 10 signal to the transmitter select logic 120, causing transmitter select logic 120 to pass the amplified signal to coil $T_2$. Similarly, the microprocessor may send a 11 kto the transmitter select logic 120, causing the transmitter select logic to pass the amplified signal to transmitter toroid $T_3$. One skilled in the art will understand that the particular transmitters to be fired may be encoded in any number of ways, and thus the particular encoding scheme used to select a transmitter is not meant to be limiting. Further, the circuitry used to select a particular transmitter also may vary without departing from the principles of this invention.

Referring still to FIG. 4, receivers $R_1$ and $R_2$ are preferably positioned below the transmitters $T_1$, $T_2$, and $T_3$ so that the resistivity measurement occurs closer to the bit 32. If desired, however, the receivers could be positioned above the transmitter array in resistivity tool 100. The receivers also preferably comprise toroids and are generally constructed in similar fashion as the transmitter toroids, although other configurations could be used for the receivers. The receiver toroids $R_1$ and $R_2$ measure the axial current induced in the resistivity drill collar 150 by a transmitter. The axial current in the collar acts as the primary of a transformer, which induces a current in the receiver windings. The conductive wire wound about the magnetic core in the receivers $R_1$ and $R_2$ couple to appropriate circuitry to determine the amount of current induced in the receiver windings.

In the preferred embodiment, and as shown in FIG. 4, the toroidal receivers $R_1$ and $R_2$ couple to a current-to-voltage converter circuit 171 and 173, respectively, each of which comprises an operational amplifier (174 and 174') and a feedback resistor ($R_{f1}$ and $R_{f2}$). The value for the feedback resistor may be different in the two circuits 171, 173, as indicated by the different notations, $R_{f1}$ and $R_{f2}$. Thus, the current detected by the receiver toroids $R_1$ and $R_2$ is converted to a voltage and applied to a volt meter (185 and 185'), such as, for example, a phase sensitive detector. Preferably, the volt meter receives a reference input signal from the output of the transmitter select logic 120. In response to the signal from the receiver toroid and the transmitter reference signal, the volt meter produces an output signal that indicates the amplitude and the phase of the induced current detected by the receiver toroids. The volt meter output signal passes through a filter circuit 187 and 187', respectively, that removes noise from the signal. The resulting voltage signal $V_1$ and $V_2$ are selectively applied to an analog-to-digital converter circuit 190 by a multiplexer circuit 195. The multiplexer determines which (if any) of the voltage signals to pass to the analog-to-digital converter 195 based upon control signals received from the microprocessor 200. The analog-to-digital converter 190 couples at its output terminal to the microprocessor 200.

The microprocessor 200 determines the radial current flowing into the formation between the receivers $R_1$ and $R_2$ based upon the axial current detected by the two receivers. Because the number of windings in the toroids are known, the axial current $I_1$ in the resistivity tool collar 150 at receiver $R_1$ can be calculated as $$I_1 = \frac{V_1 n_1}{R_{f1}} \quad (1)$$

where $I_1$ is the axial current in the resistivity tool collar at receiver $R_1$;

$V_1$ is the measured voltage measured at $R_1$;

$n_1$ is the number of windings in the $R_1$ toroid; and $R_{f1}$ is the value of the feedback resistor in the current-to-voltage circuit 171.

Similarly, the axial current in the resistivity tool collar 150 at receiver $R_2$ can be calculated as $$I_2 = \frac{V 2 n_2}{R_{f2}} \quad (2)$$

where $I_2$ is the axial current in the resistivity tool collar at receiver $R_2$;

$V_2$ is the measured voltage measured at $R_2$;

$n_2$ is the number of windings in the $R_2$ toroid; and $R_{f2}$ is the value of the feedback resistor in the current-to-voltage circuit 173.

In the preferred embodiment, each of the transmitters $T_1$, $T_2$, and $T_3$ are sequentially "fired" by activating the generator 140 to produce a current in one of the transmitter toroids. The individual transmitter to be fired preferably is selected by microprocessor 200, which transmits an encoded signal to a multiplexor 120, selecting the transmitter to be coupled to the output of generator 140. The axial current in the resistivity tool collar is measured to obtain $I_1$ and $I_2$ from receivers $R_1$ and $R_2$, respectively. The current flowing into the formation between the receivers can be determined for each transmitter based upon the difference in the axial current in the resistivity tool collar 150. Thus, the current flowing into the formation for each transmitter, $I_s$ can be determined by subtracting $I_1$, from $I_2$, as follows $$I_s = I_2 - I_1 \quad (3)$$

Once the current flowing into the formation between the receiver toroids $R_1$ and $R_2$ is known, the resistivity of the formation can be determined by microprocessor 200 for each depth of investigation (corresponding to the three different transmitters) using Ohm's Law as follows:

$$R = k(V_m/I_s) \quad (4)$$

where R is the formation resistivity for the particular depth of investigation, $V_m$ is the measured voltage, $I_s$ is the measured current flowing out into the formation between the toroidal receivers (i.e. the difference in current measured at each receiver), and k is a tool constant dependent on the spacing of the toroids. By alternatively firing three transmitters, three different resistivity measurements can be obtained, at three different depths of investigation.

The formation resistivity can be measured using various electrode arrays that measure the voltage $V_m$. The various measurements of formation resistivity can be obtained by multiple sensor electrodes to provide a full raidal resistivity measurement as well as azimuthally sensitive resistivity measurements to produce an image of the resistivity surrounding the borehole. These radial and azimuthally sensitive measurements can be obtained as shown in FIG. 4 by providing ring electrodes 205 in the collar 150 of resistivity tool 100 to measure radial resistivity, with an array of discrete electodes 125 (see FIGS. 6A, 6B) to obtain azimuthally sensitive resistivity images. In an alternative embodiment shown in FIG. 5, the radial and azimuthally sensitive resistivity measurements may both be obtained from an array of discrete electrodes 500.

Referring first to the exemplary embodiment of FIG. 4, one or more ring electrodes are provided in the collar 150 of resistivity tool 100 in an proximate to the receiver toroids $R_1$ and $R_2$. In FIG. 4, two such ring electrodes 250a and 205 b are shown between the receiver toroids for purposes of symmetry and to enable averaging of the voltage measurements obtained from each ring electrode. If desired, however, only a single ring electrode could be used, and the ring electrode could be placed above or below the receiver toroids, as well as between the toroids. As shown in FIG. 4, the ring electrode(s) connects electrically to an amplifier 207 that amplifies the voltage signal generated by the ring electrode. The amplifier 207 connects to a volt meter 215, that preferably comprises a phase sensitive detector. The volt meter 215 also receives a reference signal from the transmitter select logic 120 representing the signal transmitted by the fired transmitter. The volt meter 215 produces an output signal that is filtered to remove noise by filter 217, and applied as a voltage signal $V_{ring}$ to an input terminal of multiplexer 195. When selected by microprocessor 200, the voltage signal $V_{ring}$ is passed to the A/D converter 190, where the signal is digitized and transmitted to microprocessor 200.

The microprocessor 200 determines the radial formation resistivity based upon the value of $V_{ring}$ measured by the ring electrode(s), for each of the different transmitters. The formula used by the microprocessor 200 to determine these resistivity values $R_j$ is based on equation (4), as follows:

$$R_j = K_j \frac{V_{ring}}{I_{sj}} \quad (5)$$

where j represents the particular depth of investigation, corresponding to transmitter $T_1$, $T_2$, and $T_3$;

$K_j$ represents the constant value that is determined by the spacing of transmitter $T_j$ and the receivers;

$V_{ring}$ is the voltage measured by the ring electrode 205, for a particular depth of investigation; and $I_{sj}$ is the radial current calculated by measuring the axial current at receivers $R_1$ and $R_2$, for a particular depth of investigation.

Thus, in the embodiment of FIG. 4, where three transmitter toroids are provided, three different radial resistivity measurements are obtained—one for each transmitter, representing three different depths of investigation.

Referring still to FIG. 4, the resistivity tool 100 also preferably includes a plurality of discrete electrodes 125 spaced around the circumference of the tool collar 150. The discrete electrodes preferably comprise a piece of metal attached to the collar wall. An appropriate insulating material electrically insulates the discrete electrodes from the conductive collar. In the preferred embodiment of the FIG. 4, the discrete electrodes are mounted in the same plane transverse to the axis of collar 150, at the midpoint between the toroidal receivers $R_1$ and $R_2$. The discrete electrodes may be configured in any suitable shape, including for example, a circular disc or a rectangular structure (as shown in FIG. 4). According to the preferred embodiment, each of the discrete electrodes couple to electrode select logic 165, which may for example comprise a multiplexer circuit. The electrode select logic selectively transmits the voltage signal obtained at one of the discrete electrodes for further analysis by the microprocessor 200. The selected voltage signal is applied to an amplifier 167, which amplifies the signal before it is applied to a volt meter 155. The volt meter 155 preferably comprises a phase sensitive detector. The volt meter 155 also receives a reference signal from the transmitter select logic 120 representing the signal transmitted by the fired transmitter. The volt meter 155 produces an output signal that is filtered to remove noise by filter 157, and applied as a voltage signal $V_{ei}$ to an input terminal of multiplexer 195. When selected by microprocessor 200, the voltage signal $V_{ei}$ is passed to the A/D converter 190, where the signal is digitized and transmitted to microprocessor 200.

From the voltage $V_{ei}$ measured at each of the discrete electrodes, the microprocessor 200 determines an azimuthally sensitive measure of formation resistivity ($R_e$) for each depth of investigation j, as follows:

$$R_{ej} = K_j \frac{V_{ej}}{I_{sj}} \quad (6)$$

where j represents the particular depth of investigation, corresponding to transmitter $T_1$, $T_2$, and $T_3$;

$K_j$ represents the constant value that is determined by the spacing of transmitter $T_j$ and the receivers;

$V_e$ is the voltage measured by the discrete electrode, for a particular depth of investigation; and $I_{sj}$ is the radial current calculated by measuring the axial current at receivers $R_1$ and $R_2$, for a particular depth of investigation.

As shown in FIG. 4, the microprocessor 200 couples to a communication interface 250. Periodically, the microprocessor 200 may transmit certain selected information, such as resistivity values, to the communication interface 250. The communication interface 250 may then periodically transmit this information to the surface by any suitable medium, including pressure pulses in the drilling mud.

Figure 5:
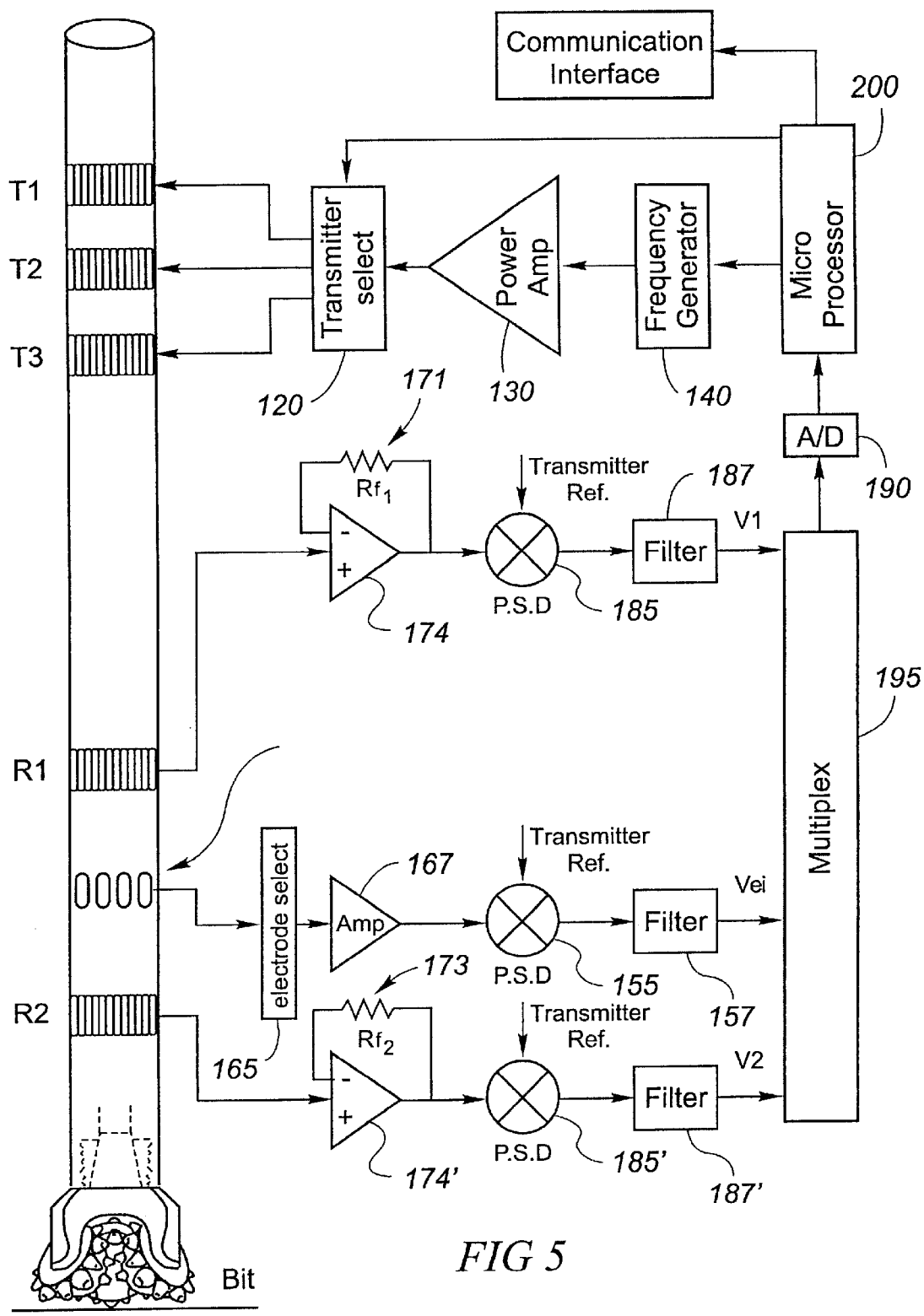
FIG. 5 shows an alternative embodiment of the present invention that includes three toroidal transmitters, a pair of toroidal receivers, and an array of discrete electrodes placed around the circumference of the tool.

Referring now to FIG. 5, the radial and azimuthally sensitive resistivity may both be determined using an array of discrete electrodes 500. In this embodiment, the ring electrode(s) of FIG. 4 may be eliminated if a sufficient number of discrete electrodes are provided. As was the case with respect to the embodiment of FIG. 4, the discrete electrodes are provided around the circumference of the drilling tool, and azimuthally sensitive resistivity values are determined for each of the discrete electrodes using equation (6).

If the number of button electrodes is sufficient (for example, eight or more discrete electrodes are provided) a radial resistivity measurement can be obtained from the discrete electrodes of FIG. 5, without a ring electrode, by summing the voltages of all discrete electrodes to get a radial voltage ($V_{radial}$):

$$V_{radial} \cong \sum_{i=1}^{N} V_{ei} \quad (7)$$

where N represents the number of discrete electrodes. The radial resistivity than can be measured for each depth of investigation as $$R_j = K_j \frac{V_{radial}}{I_{sj}} \tag{8}$$

By correlating the resistivity measurements made by the button electrodes with the directional sensors provided in the logging tool, an image of the formation surrounding the borehole can be obtained, regardless of whether the resistivity tool is rotating.

The above discussion assumes that each of the discrete electrodes are measured sequentially. Alternatively, the discrete electrodes may each be coupled to a separate sensing circuit so that the voltage of each electrode is measured simultaneously.

Figure 6A:
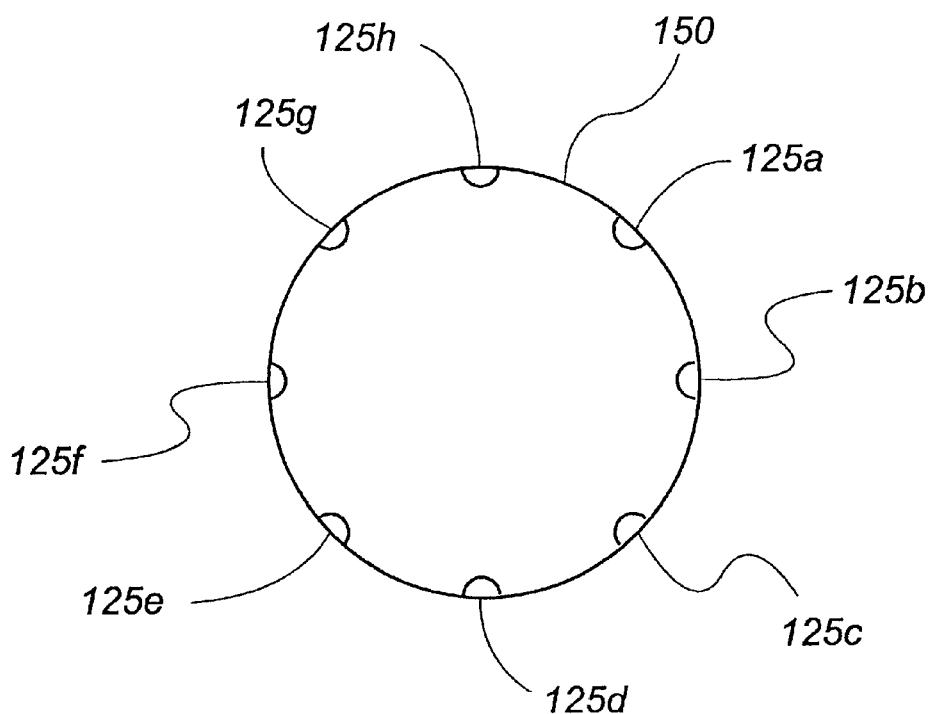
FIGS. 6A and 6B are cross-sectional views showing the placement of the button electrodes of FIGS. 4 and 5, respectively.
Figure 6B:
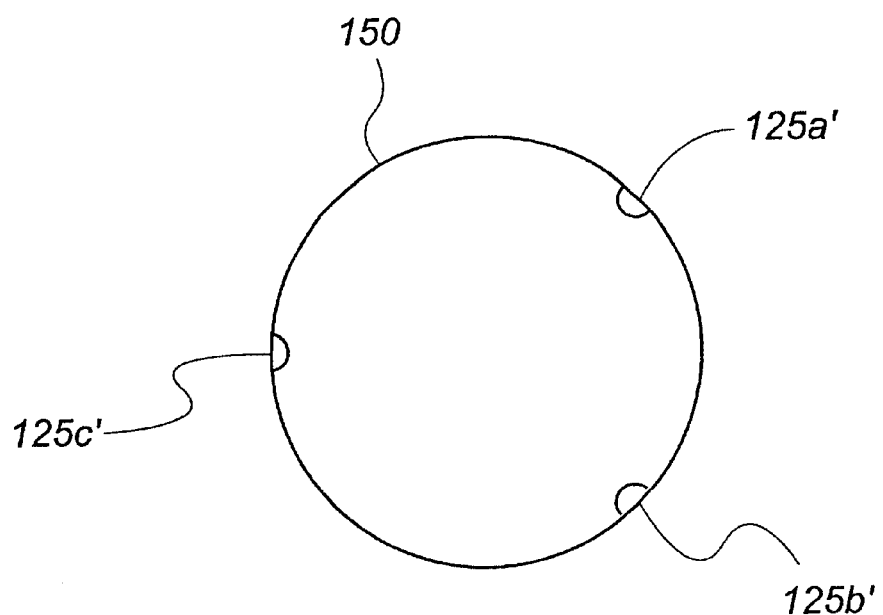

As discussed in relation to the various embodiments of FIGS. 4 and 5, various arrangements, configurations and quantities of discrete electrodes may be used. Thus, for example, and as shown in FIG. 6A, eight electrodes 125a–125h may be provided spaced 45 degrees apart around collar 150. FIG. 6B shows an alternative arrangement with only 3 electrodes 125a40 –125c' spaced 120 degrees apart around collar 150. Thus, the present invention contemplates that plural discrete electrodes are spaced around the borehole circumference, without requiring any specific number of electrodes.

In accordance with the preferred embodiment, the resistivity of the formation between the face of the drill bit 32 and the receivers $R_1$ from $R_2$ also can be determined and used as an early indication of a bed boundary. Preferably, the lower receiver toroid $R_2$ monitors the change in the current flowing into the formation through the bit, in accordance with known techniques. Thus, as the drill bit enters a more conductive formation, the amount of current flowing from the bit into the formation will be increased. This leakage of current into the formation through the drill bit can be measured by the receiver $R_2$.

Figure 8:
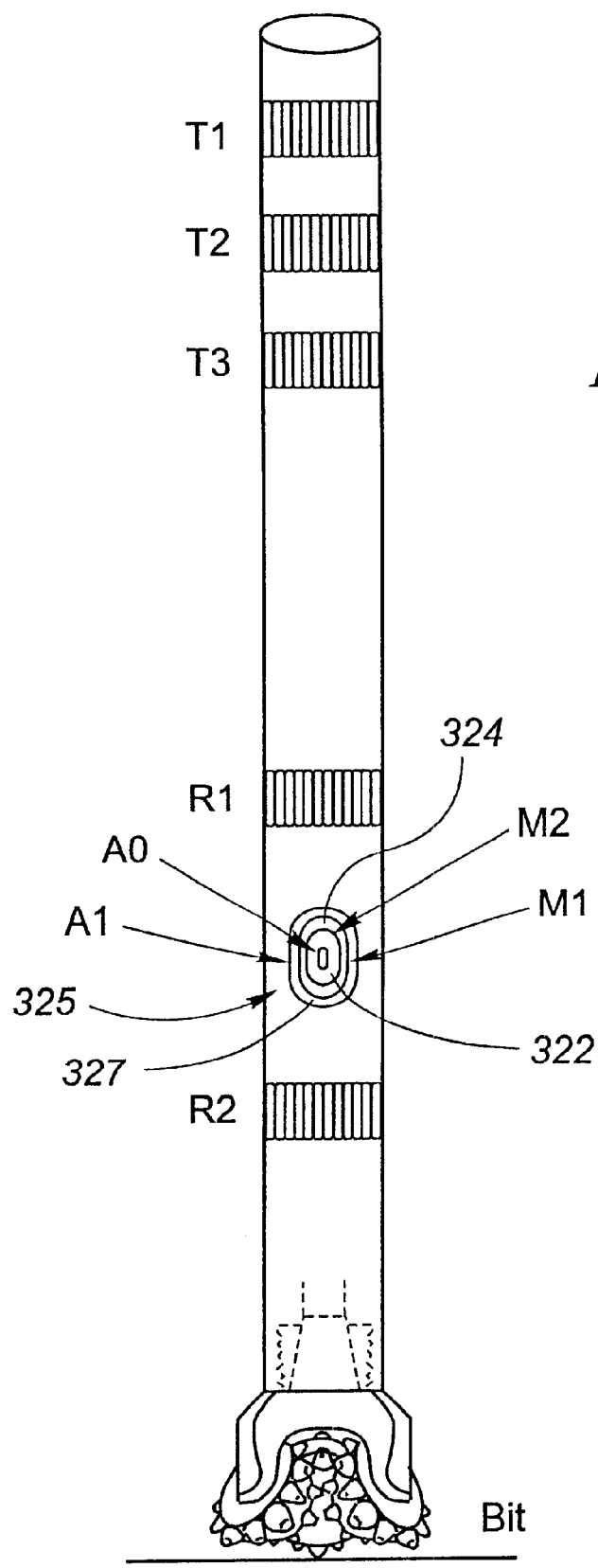
FIG. 8 illustrates an electrode as in FIGS. 4 and 5, constructed in accordance with an alternative embodiment.

Referring now to FIG. 8, an alternative embodiment of the present invention configures the discrete electrodes in a lateral-log orientation to focus current into the formation. This type of electrode design may be used instead of the simple metal electrode described above in relation to the discrete electrodes in FIGS. 4 and 5. Thus, in situations where more focusing is required, the electrodes of FIG. 7 may be used for the discrete electrodes in the embodiments of FIGS. 4 and 5.

As shown in FIG. 8, the discrete electrode 325 comprises a generally circular disc constructed on two conductive rings $M_1$ and $M_2$, and a central conductive disc $A_0$. The rings $M_1$ and $M_2$ and disc $A_0$ may be constructed of any suitable metal or semiconductor material. The conductive rings and discs are separated by an insulator material 322, 324. Insulator material 322 forms a concentric ring around conductive disc $A_0$. According to the embodiment of FIG. 8, the conductive ring $M_1$ forms a concentric ring around the insulator ring 322. Insulator material 324 forms a concentric ring around conductive ring $M_1$. The other conductive ring $M_2$ forms a concentric ring around insulator ring 324. The entire electrode structure mounts to the drill collar section by a generally circular insulative layer 327. While the electrode 325 is shown as forming a circular structure in FIG. 8, it should be understood that other structures and configurations can be similarly used in a lateral-log orientation.

In operation, the conductive rings $M_1$ and $M_2$ are kept at the same voltage potential, thus focusing current through the conductive disc $A_0$. According to the embodiment of FIG. 8, the voltage at conductive rings $M_1$ and $M_2$ are kept at the same potential by changing the current $I_1$ emitted from the conductive ring $A_1$. Thus, volt meters couple to conductive rings $M_1$ and $M_2$, and the output of the volt meters are compared and applied to a feedback loop to control the current emitted from conductive ring $A_0$. The change in current can be obtained using a variable current generator, for example. Other techniques, such as digital focusing, are possible and may be used with the electrode shown in FIG. 8 without departing from the principles of this invention. See for example, Shattuck, Bittar and Shen, "Scale Modeling of the Laterolog Using Synthetic Focusing Methods," *The Log Analyst*, July–Augusy 1987.

By measuring the voltage ($V_{M1}$) at $M_1$ and the current ($I_0$) emitted through the conductive disc $A_0$, the resistivity $R_e$ of the formation in the azimuthal direction of the electrode 325 can be determined by:

$$R_e = \frac{V_{M1}}{I_0} \tag{9}$$

As discussed above in reference to FIGS. 4, 5, 6A and 6B, a plurality of electrodes may be provided around the circumference of the tool to permit imaging of the formation.

In the preferred embodiment, the resistivity tool 100 is calibrated before use in an LWD system. This calibration determines the constant k used for the resistivity measurements. This value preferably is stored in microprocessor 200 for subsequent resistivity calculations.

The above discussion is meant to be illustrative of the principles of the present invention. Numerous variations and modifications will become apparent to those skilled in the art once the above disclosure is fully appreciated. It is intended that the following claims be interpreted to embrace all such variations and modifications.

What claimed is:

1. A resistivity logging tool, comprising:
    a collar;
    a transmitter array that includes a plurality of transmitters, mounted on said collar;
    a receiver array that includes at least a first and a second receiver spaced apart on said collar;
    a plurality of discrete electrodes spaced about the circumference of the collar; and
    a microprocessor coupled to said transmitters, said receivers, and said discrete electrodes, and wherein the microprocessor:
        selects a transmitter to be energized, thereby inducing current in the collar;
        receives a first signal from the first receiver and a second signal from the second receiver that indicates the amount of current flowing in the collar past the first and second receiver, respectively, and from said first and second signals determines the amount of current flowing into the formation between the first and second receivers; and
        receives a signal from each of the plurality of discrete electrodes indicating the voltage level at each electrode, and based upon said voltage levels, determines an azimuthally sensitive resistivity reading for each discrete electrode.

2. A resistivity logging tool as in claim 1, wherein said plurality of discrete electrodes are spaced in a plane transverse to the collar axis.

3. A resistivity tool as in claim 2, wherein each of said transmitters are fired sequentially by said microprocessor to obtain resistivity readings for multiple depths of investigation.

4. A resistivity tool as in claim 3, wherein said transmitters are spaced equal distances apart.

5. A resistivity tool as in claim 3, wherein said plurality of discrete electrodes are positioned between said receivers.

6. A resistivity logging tool as in claim 1, wherein the microprocessor generates an image of the formation resistivity based upon the azimuthally sensitive resistivity readings for each electrode.

7. A resistivity logging tool as in claim 1, wherein said transmitter array includes three transmitters extending asymmetrically on one side of the receiver array, and wherein each of said transmitters comprises a toroid mounted on said collar, and said toroid includes a magnetic core and a conductive winding.

8. A resistivity logging tool as in claim 7, wherein each of said receivers comprises a toroid mounted on said collar, and said toroid includes a magnetic core and a conductive winding.

9. A resistivity tool as in claim 1, wherein said microprocessor sums the voltage levels of each discrete electrode, and determines a radial resistivity measurement based on the summed voltage levels and the amount of current flowing into the formation between the first and second receivers.

10. A resistivity tool as in claim 9, wherein said plurality of discrete electrodes comprises at least eight electrodes.

11. A resistivity tool as in claim 1, further comprising at least one ring electrode mounted on said collar in the vicinity of said receivers, and wherein said microprocessor couples to said ring electrode and receives a signal from said ring electrode indicating the voltage level at said ring electrode, and wherein said microprocessor determines a radial resistivity measurement based on the voltage level from said ring electrode and the amount of current flowing into the formation between the first and second receivers.

12. A resistivity tool as in claim 11, wherein said plurality of discrete electrodes comprises at least three electrodes.

13. A resistivity tool as in claim 12, wherein said discrete electrodes are equally spaced around the perimeter of the collar.

14. A resistivity tool as in claim 1, wherein said discrete electrodes comprise a conductive disc and two concentric conductive rings, and said microprocessor maintains said concentric rings at the same voltage potential by varying the current emitted by said conductive disc.

15. A resistivity tool as in claim 14, wherein said microprocessor determines an azimuthally sensitive resistivity reading based upon the voltage of one of said concentric rings, and the current emitted by said disc.

16. A logging-while-drilling tool that measures resistivity of a formation through which a borehole has been drilled, comprising:
   a drill bit;
   a collar;
   a transmitter array mounted on the collar that includes a plurality of toroid transmitters capable of inducing current in the collar that flows through a part of the collar and into the formation surrounding the borehole;
   a receiver array that includes two receivers for measuring the current flowing into the formation between the receivers based upon the difference in axial current detected by the two receivers; and
   an array of discrete electrodes positioned between the two receivers of the receiver array, said discrete electrodes being spaced equally around the perimeter of the collar to provide an image of the borehole resistivity.

17. A logging-while-drilling tool as in claim 16, further comprising circuitry to measure the voltage at the each of the discrete electrodes.

18. A logging-while-drilling tool as in claim 16, further comprising a microprocessor coupled to measuring circuitry, said microprocessor operating to calculate resistivity of the formation based upon the current flowing into the formation between the receivers, and the voltage measured at each discrete electrode.

19. A logging-while-drilling tool as in claim 18, wherein said microprocessor sums the voltage levels from each discrete electrode to obtain a radial resistivity reading, and analyzes the voltage levels from each discrete electrode independently to obtain azimuthally sensitive resistivity readings.

20. A logging-while-drilling tool as in claim 16, wherein the discrete electrodes are constructed in a lateral-log orientation to focus current into the formation.

21. A logging-while drilling tool as in claim 16, wherein at least one of said receivers measures the resistivity at the drill bit.

* * * * *